May 6, 1958     F. L. MICHAELS     2,833,522
RAILING MOUNTING AND FASTENER THEREFOR
Filed Aug. 1, 1955

INVENTOR.
Frank L. Michaels
BY
Murray, Sackhoff & Murray
ATT'YS

United States Patent Office 2,833,522
Patented May 6, 1958

2,833,522

RAILING MOUNTING AND FASTENER THEREFOR

Frank L. Michaels, Burlington, Ky., assignor to The Michaels Art Bronze Company, Erlanger, Ky., a corporation of Kentucky Application August 1, 1955, Serial No. 525,635

8 Claims. (Cl. 256—65)

The present invention relates to the erection of ornamental railings and the like which are provided in the bottom with an undercut longitudinal slot to receive a fastener, whereby the railing is mounted on a wall bracket or post bracket.

An object of the invention is to provide an inexpensive, sturdy and easily applied fastener for extruded ornamental railings and the like.

Another object of the invention is to provide a one-piece fastener element that can be inexpensively cut from extruded metal strip stock and completed with a minimum of machining and operating parts.

Another object of the invention is to provide a very simple fastener construction wherein its security of attachment to the railing is not dependent on its attachment to a support bracket or the like.

These and other important objects are attained by the means described herein and exemplified in the accompanying drawings in which.

The use of ornamental hand railings and the like of extruded metal is well known and the adaptation thereof to use with various post brackets, side wall brackets or other supports requires fasteners of one sort or another at particular points on the rail when the latter is erected on the job in order to compensate for minor variations and even in changes or locations in the brackets. Some prior known and used fasteners which avoid drilling and tapping operation on the job have been relatively complicated and included many parts that involve a great deal of time and labor in erecting and adjusting the same on the job.

By the means of the present invention I have provided a very inexpensively manufactured fastener that is securely and quickly attached at a desired location in an undercut slot in the railing member and which affords greater supporting strength for the railing member or the like to which it is attached.

Figure 2:
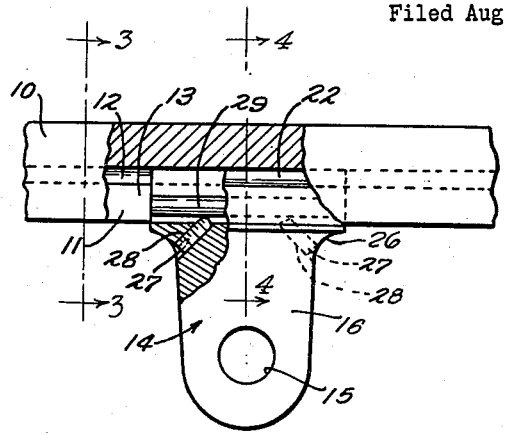
Fig. 2 is a fragmental side elevation of the railing element with the fastener of the invention secured thereto, parts being broken away to show them in cross section and to show other parts in elevation.
Figure 1:
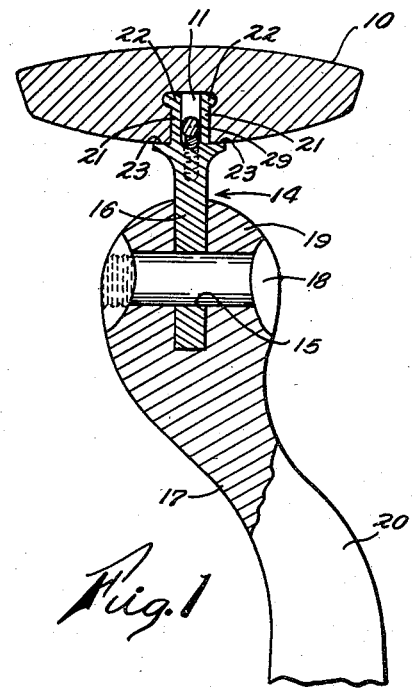
Fig. 1 is an end elevation showing an extruded metal railing element operatively mounted on the bracket of a post by a fastener of the invention, parts being broken away and shown in section.

Extruded metal railing shapes 10 of suitable cross section are well known in the art and customarily provided with a longitudinal bottom slot 11 with undercut grooves 12 on the opposite side walls 13 for the reception of conformable fastener elements and these elements in turn are connected to post or wall brackets of selected ornamental design. The fastener 14 of the present invention is inexpensively fabricated from an extruded strip metal of a cross section best illustrated in Fig. 1 and cut into short lengths, the lower part of which is suitably shaped and provided with a suitable hole 15 and forms a bolting lug portion 16 whereby the fastener is secured to a bracket such as 17 by means of a clamp bolt or screw 18. This bracket is herein illustrated, by way of example only, as a slotted knob 19 which may be an integral part of a post 20.

Along the upper end of the bolting lug portion 16 of fastener 14 is a pair of upstanding parallel ribs 21—21 each having an integral enlargement such as a bead 22 on its outer face at the top edge. A lateral shoulder 23 extends along the outside bottom of each of the ribs 21 and the shoulders are disposed in a common plane with the lowest part of a bottom 24 of a space or slot 25 that separates the ribs 21. The bottom 24 may be half-round as shown. The thickness portion which affords the shoulders 23 is filleted as at 26 on the sides and ends where it joins the body of the lug.

Figure 3:
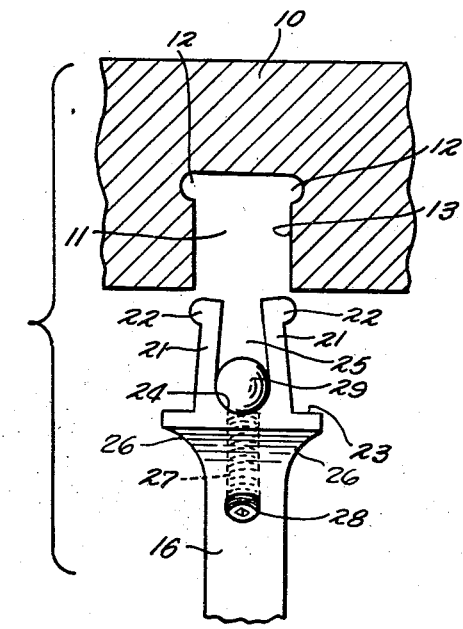
Fig. 3 is an enlarged-scale, exploded, fragmental, vertical cross-sectional view corresponding to line 3—3 of Fig. 2, and shows a fastener of the invention in position for inserting it into the rail slot.

Threaded bores 27 are entered through the opposite end fillets 26 with their axes at about 45° to the bottom wall 24 of slot 25 and these permit entry of Allen set screws or other suitable headless setscrews 28. A length of rod stock 29 of circular cross section and a diameter that will snugly pass between the ribs, and of a length approximately equal to that of said ribs, is now disposed between the ribs on the bottom 24 whereupon the ribs are bent toward each other as in Fig. 3 to retain the rod in place and the device is ready for use.

It will be understood that the particular shape of the bottom lug 16 and the bolt hole therein are as desired. It will also be understood the enlargement 22 of the spaced ribs 21 may be modified to conform to a different shape of undercut rail slot.

Figure 4:
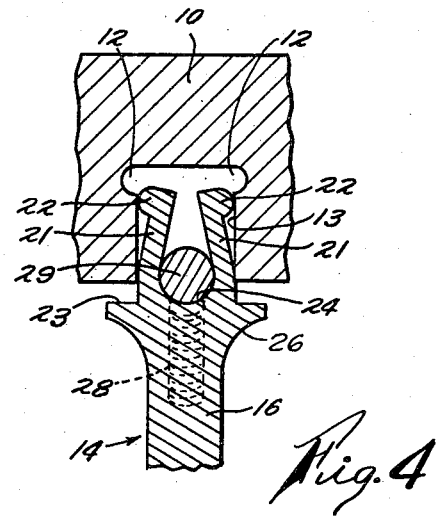
Fig. 4 is a view similar to Fig. 3 but showing the fastener partly entered into the rail slot, the section corresponding to line 4—4 of Fig. 2.

In mounting a slotted hand rail 10, a fastener 14 of the invention is quickly and easily applied to the approximate required location without regard to incidental variations in the spacing of post or wall brackets for the particular length of hand rail to be erected. The rounded or otherwise enlarged outer edges of the beads 22 along the top of thin parallel ribs 21, having been pressed together as aforesaid, can enter at least slightly between the opposite sides of the mouth of the rail slot 11 and if it be necessary the ribs will further yield toward each other in response to the force of pressure or light blows because the contour of the beads 22 will cooperate with the mouth and parallel side walls of the rail slot in bringing the free edges of the ribs together until the beads 22 are entirely within the parallel-sided slot 11 and may then be further pushed or driven for example to the position shown in Fig. 4 where the beads 22 are ready to enter the undercut grooves 12 of the slot 11. At this time the shoulders 23 on fastener 14 have approached the bottom face of the rail while the beaded ends of the ribs are approaching the undercut bottom of groove 11. Further pressure will seat shoulder 23 on the bottom of the rail and allow the beads 22 to at least slightly enter the opposed undercut grooves 12. At this time the wedge rod 29 is still snugly held on the bottom 24 and is tangent with the inside faces of ribs 21. The fastener 14 may now be tapped on either end to shift it longitudinally of the rail slot 11 to the exact position required for entering a clamping bolt 18 through matching holes in the slotted knob 19 and the hole 15 in the mounting lug portion 16 of the fastener. When all the parts are in the precisely adjusted position the set screws 28 are driven further into the tapped holes 27 whereupon the ends of the set screws pass through the bottom face 24 of the fastener intermediate the ribs and begin to push the wedge rod 29 upwardly to exert a powerful spreading and wedging action on ribs 21 and thus positively bind the rail 10 and fastener 14 together with the beads 22 fully seated in the undercut grooves 12 so that it is now impossible to pull the rail and fastener apart.

If for any reason it should become necessary to remove the rail or to adjust the fastener in the rail, the set screws can be backed away from the wedge rod and the latter may be forced back to seat on the bottom 24 of the space between the ribs, thus minimizing the bending of the ribs on the rod. The rod can be longitudinally removed from between the ribs by the use of a drift punch following which the lug portion 16 of fastener 14 can be subjected to withdrawal pressures such that the lower curved faces of beads 22 will be cammed out of the opposed grooves 12 and compress the free edges of the ribs together and into the straight parallel-walled portion of the slot 11. The fastener and its simple parts can be removed from and reinserted and secured in the rail groove without any reconditioning operation or parts replacement since the deflection of the ribs for placement and removal operations has no destructive action on the fastener.

What is claimed is:

1. A fastener for a railing member having a bottom slot with undercut side walls, comprising a unitary member having a bolting lug portion of a thickness approximating the width of the mouth of the rail slot and having laterally projecting shoulders along each side of the upper end thereof for marginally seating on the bottom of the railing member on opposite sides of the mouth of the slot, a pair of spaced parallel ribs on said upper end having outer faces conforming to the opposed slot walls, a rod member lying on said end between the ribs and contacting the ribs closely adjacent said end and defining opposite lines on which the free top edges of the ribs may be bent toward each other to permit the ribs to be entered substantially to the bottom of the rail slot and the bottom margins of the railing member to seat on the shoulders, and means to bodily shift the rod member toward the free top edges of the ribs and thereby spread the latter into positive binding abutment with the sides of the rail slot.

2. The combination as set forth in claim 1 characterized by the fact that the rod-shifting means comprises headless setscrews entered diagonally through the rib-carrying end of the bolting lug portion from adjacent edges of said lug and are retractable to permit removal of the rod member and subsequent removal of the fastener from the rail slot.

3. The combination with a hand rail having an undercut bottom slot, of a fastener for on-the-job rigid mounting in the undercut slot in the rail comprising a unitary element having a bolting lug portion for suitable attachment to a rail-supporting bracket and of a thickness approximating the width of the mouth of the rail slot, said bolting lug portion provided along each side of the upper end thereof with a lateral shouldered extension to seat on the bottom of the rail marginally on opposite sides of the rail slot, a pair of parallel spaced ribs projecting from said end and having along the top edges of their outer faces integral enlargements in overhanging relation to the shoulders and adapted for conforming entry respectively in the opposed undercut sides of the rail slot, a rod member lying on said end of the lug between the ribs and permitting the top free edges of the ribs to be forced together for entry into the mouth of the rail slot in response to pressure on the lug portion, and threaded means carried by the lug portion for endwise entry between the ribs for shifting the rod bodily toward the free ends of the ribs and thereby positively shifting and holding the outer faces of said ribs in binding conforming contact with the sides of the rail slot and immovably seating the bottom of the rail on the shoulders.

4. A railing fastener comprising a uniting metal body having along the sides of one end a pair of shoulder members, a pair of parallel spaced ribs on said end parallel with and perpendicular to said end, the outer faces of said ribs having beads at the top edges thereof, a rod member supported on said end between said ribs and contacting the adjacent faces of the ribs and defining a bending line for each rib adjacent the bottom thereof when the free edges of the ribs are forced toward each other and means comprising setscrews passing through said end of the lug adjacent the opposite ends of the ribs and into the space between said ribs for forcibly shifting the rod bodily toward the free edges of the ribs and restoring the ribs to original parallelism.

5. A fastener member for binding engagement on the bottom of a railing member and on the side walls of an undercut slot in said railing member, said fastener comprising a bolting lug portion for connection to a suitable support bracket and, along the upper end of said lug portion, a pair of parallelly spaced bendable ribs having enlargements along the top edges of their outer faces arranged and adapted to conforming abutment with the undercut side walls of the railing slot, integral laterally projecting shoulders on the lug portion along the juncture of the ribs and lug portion, a rod of a diameter to contact the adjacent faces of the ribs and resting on said upper end between the ribs, threaded bores of a diameter less than the space between the ribs and extending diagonally to the space between the ribs, and threadedly adjustable members in said bores for moving the rod bodily away from said end toward the top edges of the ribs.

6. The combination as set forth in claim 5 characterized by the fact that the bottom of the space between the ribs is curved complementary to the side of the rod and the normal space between adjacent faces of the ribs closely approximates a diameter of the rod.

7. A fastener of the class described comprising a unitary body having at least one relatively wide end, a pair of spaced parallel, upstanding bendable ribs inwardly offset from the sides of said end to provide shoulders along the bottom outer faces of said ribs and provided along the tops of the outer faces of said ribs with substantially half-round beads in spaced overhanging relation to the shoulders, said beaded edges of the ribs adapted to be forced together for disposing the beads into nonoverhanging relation to the shoulders to permit the ribs to be forced into an undercut slot of a cross-sectional shape complementary to the ribs in their normal parallel relation, a rod member extending endwise between the ribs and initially resting on said end and tangentially contacting said ribs closely adjacent said end to permit bending of the ribs as aforesaid for retaining the rod member on said end against accidental separation and threaded members extending angularly through the body and into contact with the rod for positively shifting the rod bodily away from said end to restore and nonyieldingly retain the ribs in substantially their initial parallel relation whereby the fastener may be positively secured in a complementary undercut slot.

8. The combination as set forth in claim 7 characterized by the fact that the bottom of the space between the ribs is curved complementary to the side of the rod and the normal space between adjacent faces of the ribs closely approximates a diameter of the rod.

References Cited in the file of this patent

UNITED STATES PATENTS

| Number | Name | Date |
|---|---|---|
| 406,657 | Macrea | July 9, 1889 |
| 1,469,977 | Weaver | Oct. 9, 1923 |
| 1,729,047 | Miller | Sept. 24, 1929 |
| 2,616,328 | Kingsmore | Nov. 4, 1952 |

U. S. DEPARTMENT OF COMMERCE
PATENT OFFICE

CERTIFICATE OF CORRECTION

Patent No. 2,833,522     Frank L. Michaels     May 6, 1958

It is hereby certified that error appears in the printed specification of the above numbered patent requiring correction and that the said Letters Patent should read as corrected below.

Column 3, line 72, for "uniting metal" read -- unitary --.

Signed and sealed this 24th day of June 1958.

(SEAL)
Attest:

KARL H. AXLINE
Attesting Officer

ROBERT C. WATSON
Commissioner of Patents